United States Patent
Arakawa et al.

(10) Patent No.: US 10,276,320 B2
(45) Date of Patent: Apr. 30, 2019

(54) INPUT DEVICE

(71) Applicant: Panasonic Intellectual Property Management Co., Ltd., Osaka (JP)

(72) Inventors: Toru Arakawa, Fukui (JP); Takatoshi Ono, Fukui (JP); Masahiro Mizukami, Fukui (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/751,572

(22) PCT Filed: Aug. 2, 2016

(86) PCT No.: PCT/JP2016/003550
§ 371 (c)(1),
(2) Date: Feb. 9, 2018

(87) PCT Pub. No.: WO2017/033403
PCT Pub. Date: Mar. 2, 2017

(65) Prior Publication Data
US 2018/0233302 A1 Aug. 16, 2018

(30) Foreign Application Priority Data

Aug. 24, 2015 (JP) ................. 2015-164832

(51) Int. Cl.
*H01H 9/20* (2006.01)
*H01F 7/08* (2006.01)
(Continued)

(52) U.S. Cl.
CPC ............... *H01H 9/20* (2013.01); *H01F 7/081* (2013.01); *H01H 19/14* (2013.01); *B60K 37/06* (2013.01); *H01H 19/60* (2013.01)

(58) Field of Classification Search
CPC .......... H01H 9/20; H01H 19/60; H01H 19/14; H01H 19/02; H01H 25/06; H01F 7/081
(Continued)

(56) References Cited

U.S. PATENT DOCUMENTS 4,296,292 A * 10/1981 Schuberth ............... F16F 9/145
200/336
6,998,553 B2 * 2/2006 Hisamune .............. H01C 10/32
200/336
(Continued)

FOREIGN PATENT DOCUMENTS

EP 2161644 3/2010
JP 2003-217397 7/2003
(Continued)

OTHER PUBLICATIONS

International Search Report of PCT application No. PCT/JP2016/003550 dated Nov. 1, 2016.

*Primary Examiner* — Edwin A. Leon
*Assistant Examiner* — Lheiren Mae A Caroc
(74) *Attorney, Agent, or Firm* — Greenblum & Bernstein, P.L.C.

(57) ABSTRACT

The present disclosure provides an input device that puts signals into equipment in response to turning action and that can come down in thickness along an axis of a rotary shaft. The input device includes a knob configured to be turned, a rotary shaft configured to turn together with the knob, and a flange disposed around an outer peripheral surface of the rotary shaft. The flange is designed to regulate turning of the rotary shaft. The input device further includes an elastic component that is disposed around the outer peripheral surface of the rotary shaft and is fastened to the flange, a (Continued)

rotation controller that permits or inhibits turning of the elastic component, and a detector that detects a rotational state of the rotary shaft.

7 Claims, 7 Drawing Sheets

(51) Int. Cl.
*H01H 19/14* (2006.01)
*H01H 19/60* (2006.01)
*B60K 37/06* (2006.01)

(58) Field of Classification Search
USPC .................................................. 200/336, 564
See application file for complete search history.

(56) References Cited

U.S. PATENT DOCUMENTS

| 2003/0160680 | A1 | 8/2003 | Hisamune et al. |
| 2004/0231434 | A1 | 11/2004 | Shibazaki et al. |

FOREIGN PATENT DOCUMENTS

| JP | 2005-019113 | 1/2005 |
| JP | 2010-062075 | 3/2010 |

* cited by examiner

INPUT DEVICE

This application is a U.S. national stage application of the PCT International Application No. PCT/JP2016/003550 filed on Aug. 2, 2016, which claims the benefit of foreign priority of Japanese patent application No. 2015-164832 filed on Aug. 24, 2015, the contents all of which are incorporated herein by reference.

TECHNICAL FIELD

The present disclosure relates to input devices used for operation of electrical apparatuses or vehicles, for example. In particular, the present disclosure relates to an input device that enables the operation of an electrical apparatus, a vehicle, or other equipment by letting a knob turned by a human hand.

BACKGROUND ART

Conventionally, input devices have been equipped with knobs that are manually turned and rotary encoders that detect rotational angles of these knobs. For example, PTL 1 discloses an input device that includes a lock mechanism to prevent a knob from turning and an elastic component interposed between the lock mechanism and a shaft holding the knob. The input device inhibits turning of the knob by the lock mechanism and concurrently allows the knob to slightly turn owing to flexure of the elastic component. The input device detects slight turning of the knob and thus can clear the inhibited state in response to detection results, as is disclosed in PTL 1.

CITATION LIST

Patent Literature

PTL 1: Unexamined Japanese Patent Publication No. 2005-19113

SUMMARY OF THE INVENTION

It is an object of the present disclosure to provide an input device that can relatively come down in thickness along an axis of a rotary shaft.

To accomplish the object described above, an input device according to the present disclosure includes a knob, a rotary shaft, a flange, an elastic component, a rotation controller, and a detector.

The knob is configured to be turned by a human hand. The rotary shaft is connected to the knob and is configured to turn together with the knob. The flange is disposed around an outer peripheral surface of the rotary shaft. The flange is configured to turn together with the rotary shaft. The elastic component having flexibility is disposed around the outer peripheral surface of the rotary shaft and is fastened to the flange. The rotation controller permits or inhibits turning of the elastic component around the rotary shaft. The detector detects a rotational state of the rotary shaft.

An input device according to the present disclosure detects turning of a knob and thereby enables the operation of an electric apparatus or a vehicle. At the same time, the input device can relatively come down in thickness along an axis of a rotary shaft.

DESCRIPTION OF EMBODIMENT

Figure 1:
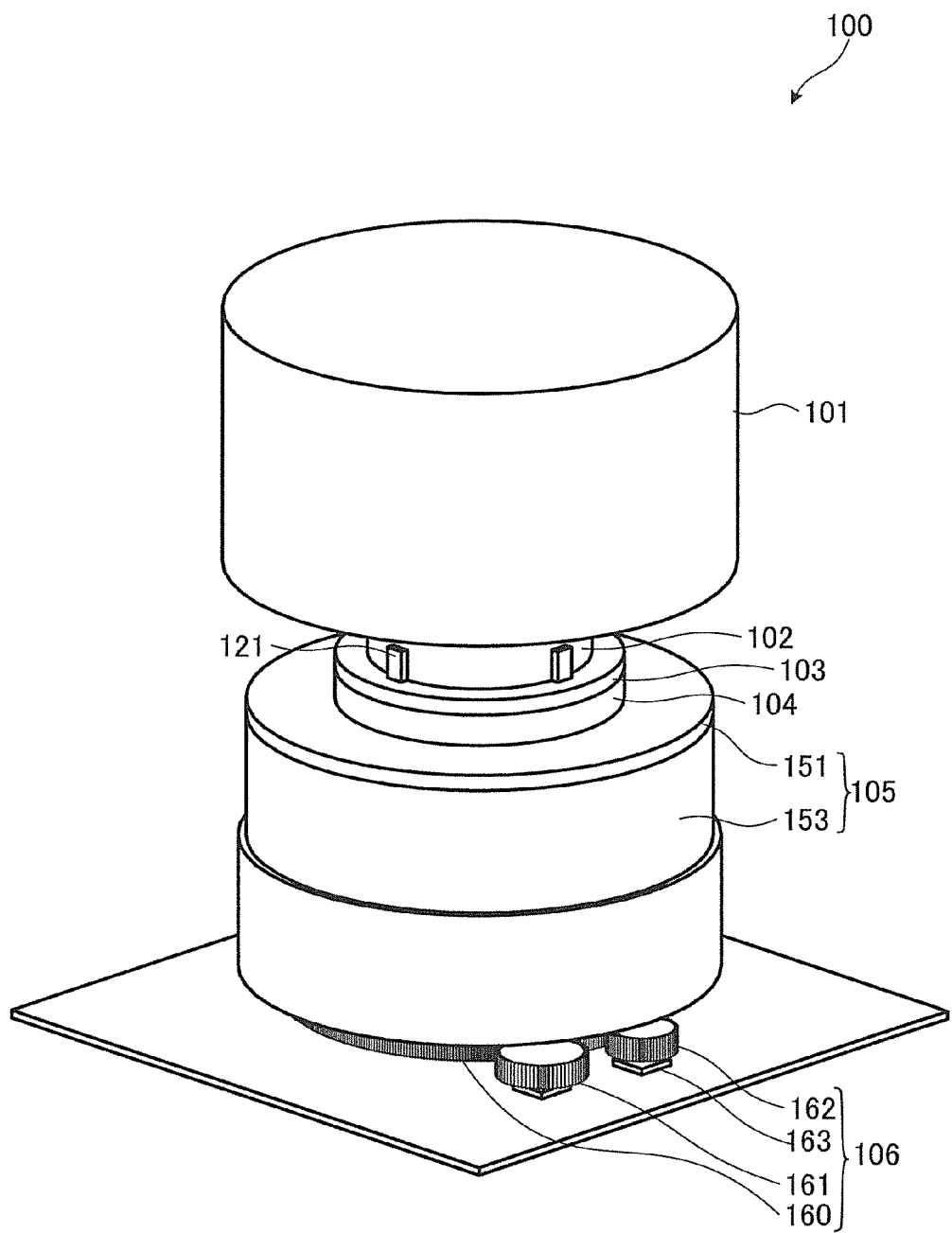
FIG. 1 is a perspective view of an input device according to an exemplary embodiment of the present disclosure.

Prior to describing an exemplary embodiment of the present disclosure, problems with a conventional device will be briefly described. The input device disclosed in PTL 1 includes a knob, a shaft holding the knob, an elastic component, and a lock mechanism that are disposed in a straight line along a rotating axis. This configuration makes it difficult for the input device to come down in thickness along the rotating axis.

The exemplary embodiment of the present disclosure will now be described herein in detail with reference to the drawings appropriately. However, detailed description more than necessary may be omitted. For example, detailed description of a known matter or repetitive description of a substantially identical configuration may be omitted. Such omissions are aimed to prevent the following description from being redundant more than necessary, and to help those skilled in the art easily understand the following description.

Note that the attached drawings and the following description are provided, by the inventors, for those skilled in the art to fully understand the present disclosure, and should not be construed to limit the spirit and scope of the appended claims.

The drawings are schematic views that are emphasized, simplified, enlarged or shrunk as appropriate to illustrate the present disclosure. Thus, shapes, positional relationships, or ratios in the drawings may differ from those of actual components.

FIG. 1 is a perspective view of an input device according to the exemplary embodiment of the present disclosure.

Figure 2:
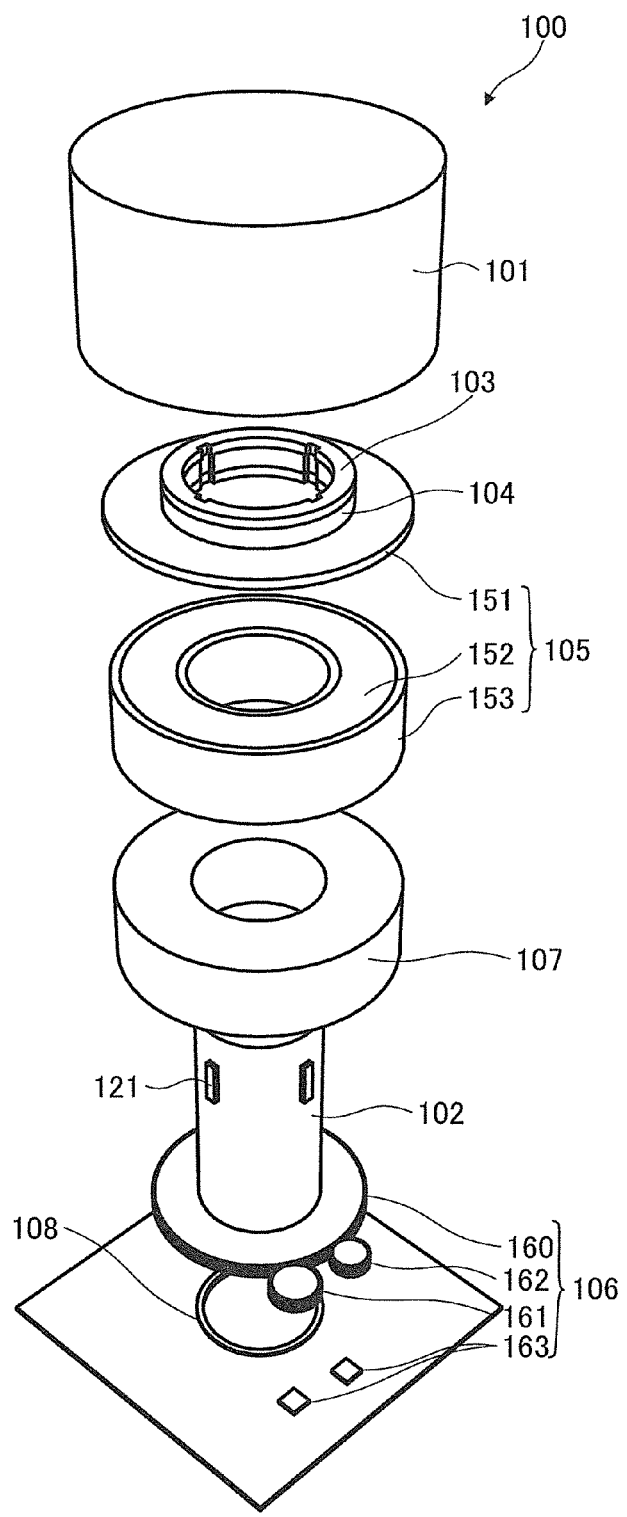
FIG. 2 is an exploded perspective view of the input device according to the exemplary embodiment of the present disclosure.

FIG. 2 is an exploded perspective view of the input device according to the exemplary embodiment of the present disclosure.

Figure 3:
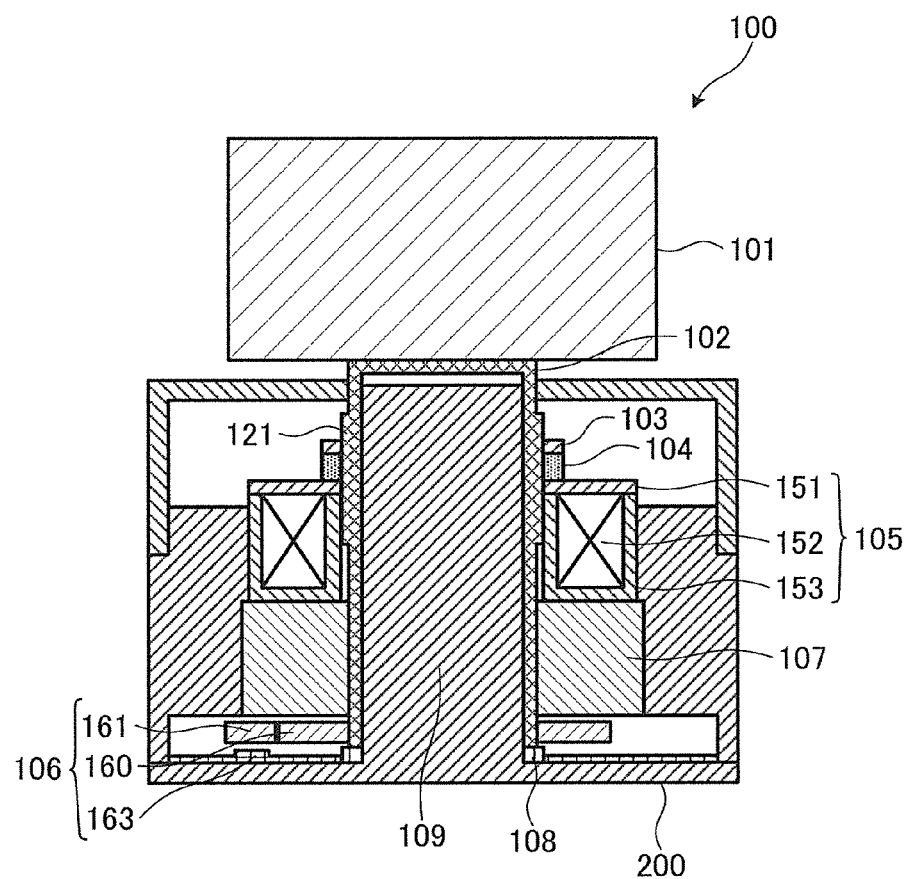
FIG. 3 is a cross-sectional view of the input device built into a housing according to the exemplary embodiment of the present disclosure.

FIG. 3 is a cross-sectional view of the input device built into a housing according to the exemplary embodiment of the present disclosure.

With reference to these drawings, input device 100 is a device that can put signals into an electrical apparatus, a vehicle, or other equipment in response to turning action by a human hand. Input device 100 includes knob 101, rotary shaft 102, flange 103, elastic component 104, rotation controller 105, and detector 106. In this exemplary embodiment, input device 100 has detent unit 107, switch 108 (refer to FIGS. 2 and 3), stationary shaft 109 (refer to FIG. 3), and housing 200 (refer to FIG. 3).

Knob 101 is a component designed to be pinched and turned by a human hand. In this exemplary embodiment, knob 101 is cylindrical and has a length that is equal to or shorter than a diameter. An outer peripheral surface of knob 101 has a knurled pattern (not shown) to prevent fingers from slipping at the time of turning action. Knob 101 illustrated in the drawings looks solid. However, knob 101 may be hollow inside. Knob 101 is made from metal, resin, or any arbitrarily selected material. Knob 101 may take on any external appearance such as a star shape, other than the cylindrical form.

Rotary shaft 102 is a rod-shaped component connected to knob 101. Rotary shaft 102 turns together with knob 101 turned by a human hand. In this exemplary embodiment, rotary shaft 102 is coaxial with knob 101 and holds detachable knob 101. As shown in FIG. 3, rotary shaft 102 is tubular such that rotary shaft 102 coaxially fits onto stationary shaft 109 that stands in housing 200. Rotary shaft 102 is designed to turn around stationary shaft 109. An outer peripheral surface of rotary shaft 102 is provided with four first protrusions 121 extending along an axis of rotary shaft 102 and radially projecting. First protrusions 121 are equally spaced circumferentially.

No particular limitation is placed on material from which rotary shaft 102 is made. However, rotary shaft 102 should preferably be made from a non-magnetic material if rotation controller 105, detector 106, and detent unit 107 described later perform functions using magnetic force. Rotary shaft 102 may be made from a resin, for example.

Figure 4:
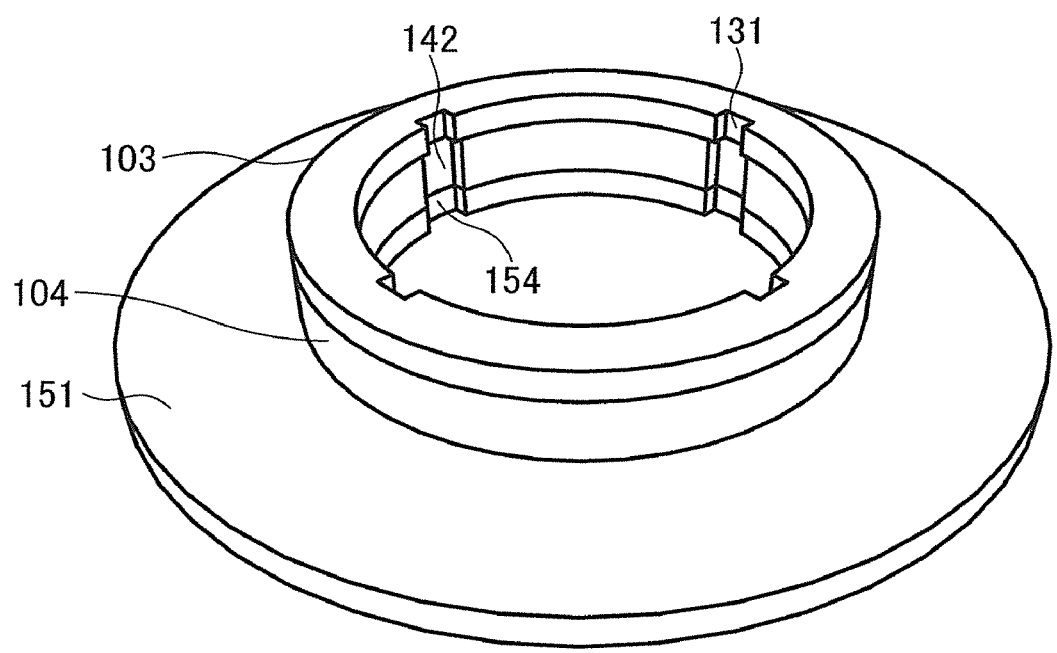
FIG. 4 is a perspective view illustrating a flange, an elastic component, and an armature.

FIG. 4 is a perspective view illustrating a flange, an elastic component, and an armature.

Flange 103 is a component disposed around the outer peripheral surface of rotary shaft 102. The component is designed to turn together with rotary shaft 102 and regulate turning of rotary shaft 102.

In this exemplary embodiment, as shown in the drawing, flange 103 is a plate-shaped and annular component having four first grooves 131 that are equally spaced on an inner peripheral surface. First grooves 131 fit on first protrusions 121 provided on rotary shaft 102, respectively. First grooves 131 and first protrusions 121 fit neatly on each other in a circumferential direction of rotary shaft 102. Flange 103 turns together with rotary shaft 102 if rotary shaft 102 turns in either direction. When flange 103 is kept from turning relative to housing 200, rotary shaft 102 is kept from turning relative to housing 200.

First grooves 131 move smoothly on first protrusions 121 along the axis of rotary shaft 102. Even if rotary shaft 102 shifts axially, flange 103 remains unchanged axially.

No particular limitation is placed on material from which flange 103 is made. However, flange 103 should preferably be made from iron or other metal if flange 103 is connected to and bonded to elastic component 104 described later by vulcanization.

Alternatively, rotary shaft 102 may have first grooves that are radially depressed and axially extend, while flange 103 is provided with first protrusions fitting into the first grooves and being slidable along the first grooves.

Elastic component 104 is disposed around the outer peripheral surface of rotary shaft 102 and is fastened to flange 103. Elastic component 104 has flexibility that permits flange 103 to turn around rotary shaft 102 to a predetermined angle.

In this exemplary embodiment, elastic component 104 is a plate-shaped and annular component that is thicker than flange 103. Elastic component 104 has four second grooves 142 that are equally spaced on an inner peripheral surface. Second grooves 142 are disposed such that the second grooves are aligned with first grooves 131 and fit onto first protrusions 121 provided on rotary shaft 102. Second grooves 142 are wider than first grooves 131 in the circumferential direction of rotary shaft 102. Thus, second grooves 142 and first protrusions 121 fit on each other with a predetermined extent of allowance existing between the grooves and the respective protrusions. Second grooves 142 move smoothly on first protrusions 121 along the axis of rotary shaft 102. Even if rotary shaft 102 shifts axially, elastic component 104, in common with flange 103, remains unchanged axially.

Elastic component 104 is made from a material that has flexibility and thereby permits fastened flange 103 to slightly turn in the circumferential direction of rotary shaft 102. The material also has restoring force and elastic component 104 thus can put flange 103 back into an original position. Specifically, examples of the material, from which elastic component 104 is made, include flexible elastomers and hard rubber.

If rotary shaft 102 has first grooves that are radially depressed and axially extend, elastic component 104, in common with flange 103, may be provided with second protrusions fitting into the first grooves and being slidable along the first grooves. In this case, a predetermined extent of allowance exists between the first grooves and the respective second protrusions in the circumferential direction of rotary shaft 102.

Rotation controller 105 is a device that permits or inhibits turning of elastic component 104 around rotary shaft 102. In this exemplary embodiment, rotation controller 105 is an electromagnetic brake. With reference to FIGS. 2 and 3, rotation controller 105 includes armature 151, electromagnet 152, and yoke 153.

Armature 151 is a component that is disposed around the outer peripheral surface of rotary shaft 102 and is fastened to a side of elastic component 104 opposite flange 103.

In this exemplary embodiment, armature 151 is a plate-shaped and annular component that is equivalent in thickness to flange 103. Armature 151 has four third grooves 154 that are equally spaced on an inner peripheral surface. Third grooves 154 are disposed such that the third grooves are aligned with first grooves 131 and fit onto first protrusions 121 provided on rotary shaft 102. Third grooves 154 are equivalent in width to second grooves 142 and wider than first grooves 131 in the circumferential direction of rotary shaft 102. Thus, third grooves 154 and first protrusions 121 fit on each other with a predetermined extent of allowance existing between the grooves and the respective protrusions. Third grooves 154 move smoothly on first protrusions 121 along the axis of rotary shaft 102. Even if rotary shaft 102 shifts axially, armature 151, in common with flange 103, remains unchanged axially.

Armature 151 is made from a magnetic material that gets armature 151 to be fastened by turning-on of electromagnet 152 and to be unfastened by turning-off of electromagnet 152. Specifically, examples of the material, from which armature 151 is made, include iron.

If rotary shaft 102 has first grooves that are radially depressed and axially extend, armature 151, in common with flange 103, may be provided with third protrusions fitting into the first grooves and being slidable along the first grooves. In this case, a predetermined extent of allowance exists between the first grooves and the respective third protrusions in the circumferential direction of rotary shaft 102.

Flange 103 and armature 151 are locked in place, with elastic component 104 put between the two components. No particular limitation is placed on the method of locking flange 103, elastic component 104, and armature 151 in place. These components may be joined together by an adhesive, for example. If elastic component 104 is made from rubber, flange 103, elastic component 104, and armature 151 may be joined and bonded together by vulcanization, while elastic component 104 is being formed between flange 103 and armature 151 facing each other through a predetermined interval.

Electromagnet 152 is a coil of a conductor disposed around the outer peripheral surface of rotary shaft 102. Electromagnet 152 is designed to generate magnetic force in response to electric power supplied from outside and get into a state of no magnetic force generation when the supply of electric power is interrupted. In this exemplary embodiment, electromagnet 152 is an annular component twining around rotary shaft 102, and is disposed and contained in yoke 153.

Yoke 153 is a component that is disposed around the outer peripheral surface of rotary shaft 102 and controls magnetic flux generated from electromagnet 152. Yoke 153 inhibits armature 151 from turning around rotary shaft 102 by producing friction with armature 151 through strong magnetic attraction of armature 151. If magnetic flux from electromagnet 152 disappears, yoke 153 reduces friction with armature 151 due to lost attraction of armature 151 and thus permits armature 151 to turn around rotary shaft 102.

No particular limitation is placed on shape of yoke 153. In this exemplary embodiment, yoke 153 is an annular container for containing electromagnet 152. Yoke 153 is made from a magnetic material that enables control of magnetic flux generated from electromagnet 152. Specifically, examples of the material, from which yoke 153 is made, include iron.

Detector 106 is a device that detects a rotational state of rotary shaft 102. In this exemplary embodiment, detector 106 includes main cogwheel 160, first cogwheel 161, second cogwheel 162, and sensors 163.

Main cogwheel 160 is a spur wheel that is attached coaxially to rotary shaft 102 and turns together with rotary shaft 102.

First and second cogwheels 161 and 162 are spur wheels having different diameters and mesh with main cogwheel 160 to turn. First and second cogwheels 161 and 162 are fitted with magnets that allow sensors 163 to detect turning of the respective cogwheels.

Sensors 163 are elements that detect turning of first and second cogwheels 161 and 162. In this exemplary embodiment, sensors 163 have magnetoresistive elements to individually detect movements of the magnets provided respectively on first and second cogwheels 161 and 162.

In detector 106, two sensors 163 detect turning of respective first and second cogwheels 161 and 162 that individually mesh with main cogwheel 160 and have different diameters. This configuration enables the detector to detect not only a relative rotational state of rotary shaft 102 through main cogwheel 160 but also absolute rotational state, i.e. a rotational state of rotary shaft 102 with respect to housing 200.

Detector 106 may be a rotary encoder or any apparatus other than the device described above.

Detent unit 107 is a crisp feel device used to provide a hand of a person with force feedback via rotary shaft 102 to let the person know that knob 101 has been turned to a predetermined angular position. Detent unit 107 is designed to provide the human hand turning knob 101 with a crisp feel (a click feel) of a pin energized toward a notch engaging with the notch or of the pin disengaging from the notch, for example. In this exemplary embodiment, detent unit 107 generates crisp feels using magnetism and controls the state of magnetism to regulate the generation of a crisp feel like changing or canceling the crisp feel.

Switch 108 is a device used to detect axial movement of rotary shaft 102. In this exemplary embodiment, switch 108 is a push switch designed to detect a human motion of pressing knob 101 via rotary shaft 102 and send a signal.

Housing 200 is a component that is fastened to an electrical apparatus, a vehicle, or other equipment and acts as a positional reference to turning of knob 101 and pressing or pulling of knob 101. Housing 200 holds yoke 153, a part of rotation controller 105, in place and holds part of detent unit 107 in place. Housing 200 is fitted with switch 108 and sensors 163, as well as rotatable first and second cogwheels 161 and 162.

In this exemplary embodiment, input device 100 is built into housing 200. Specifically, housing 200 contains input device 100 excluding knob 101 and an end of rotary shaft 102.

Input device 100 described above includes flange 103, elastic component 104, rotation controller 105, detector 106, and detent unit 107 that are disposed around the outer peripheral surface of rotary shaft 102. These components are not disposed on the axis of rotary shaft 102. As a result, input device 100 can come down in thickness along the axis of rotary shaft 102.

Rotary shaft 102 fits on armature 151, with a predetermined extent of allowance existing between the two components in the circumferential direction of rotary shaft 102. This configuration enables elastic component 104 to be flexed to an extent of allowance between rotary shaft 102 and at least one of elastic component 104 and armature 151, and thus allows knob 101 to be turned while armature 151 is fastened. However, when knob 101 has been turned to a predetermined angular position corresponding to the extent of allowance, rotary shaft 102 engages with fastened armature 151 or elastic component 104, and knob 101 does not turn any further. In other words, even if a person turns knob 101 with strong force, rotary shaft 102 turns only to the extent of allowance, so that elastic component 104 does not get forcibly flexed. This configuration can lessen the load put on elastic component 104 and improve the life of input device 100.

Operation of input device 100 actuated by a human hand will now be described by taking input device 100 mounted on a vehicle as an example.

Figure 5:
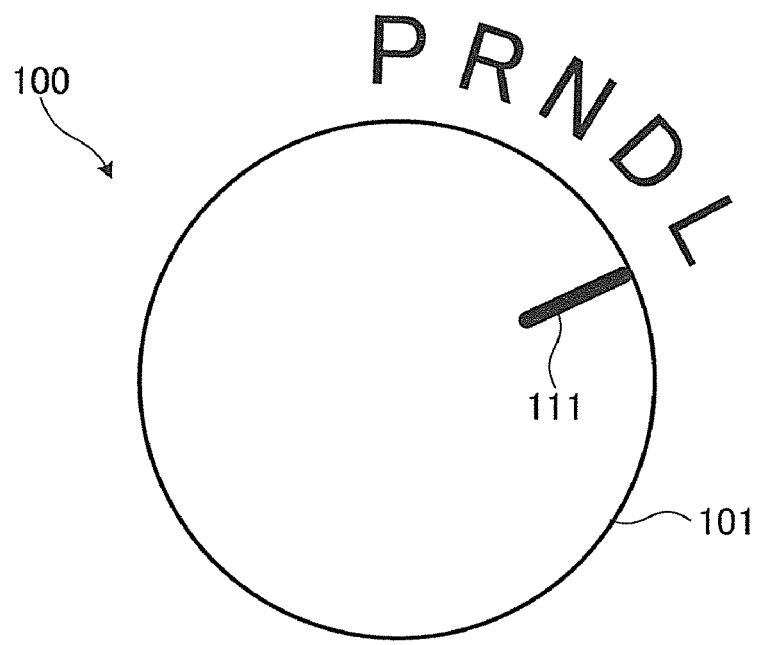
FIG. 5 is a plan view of the input device mounted on a vehicle according to the exemplary embodiment of the present disclosure.

FIG. 5 is a plan view of the input device mounted on a vehicle according to the exemplary embodiment of the present disclosure.

As shown in the drawing, input device 100 is mounted on a vehicle (not shown) to change an operating state of the vehicle. P, R, N, D, and L in the drawing denote respective meanings below: P: parking (a position in which tires are locked); N: neutral (a position in which tires are unlocked); D: drive (a position for normal driving); L: low (a position for the vehicle requiring engine braking, etc.); and R: reverse (a position in which the vehicle reverses).

A driver normally uses input device 100 at the time of driving the vehicle to select the operating state of the vehicle by turning knob 101. Guide 111 is inscribed on knob 101 to indicate a selected position. The detent unit controls torque from the rotary shaft so as to produce strong force feedback when guide 111 indicates each of positions P, R, N, D, and L. The detector sends information about which position P, R, N, D, or L guide 111 is indicating to the vehicle.

While guide 111 is indicating position D, the rotation controller has the armature fastened and thereby inhibits knob 101 from turning. This is intended to prevent the position of guide 111 from involuntarily changing to L while the vehicle is moving forward or in similar situations. This in turn prevents engine braking from being abruptly applied.

The driver changes the position of guide 111 from D to L by turning knob 101 clockwise while pressing knob 101. Pressing knob 101 presses the switch via the rotary shaft. The switch then emits a signal for releasing the rotation controller. This allows the driver to change the position of guide 111 to L.

Figure 6:
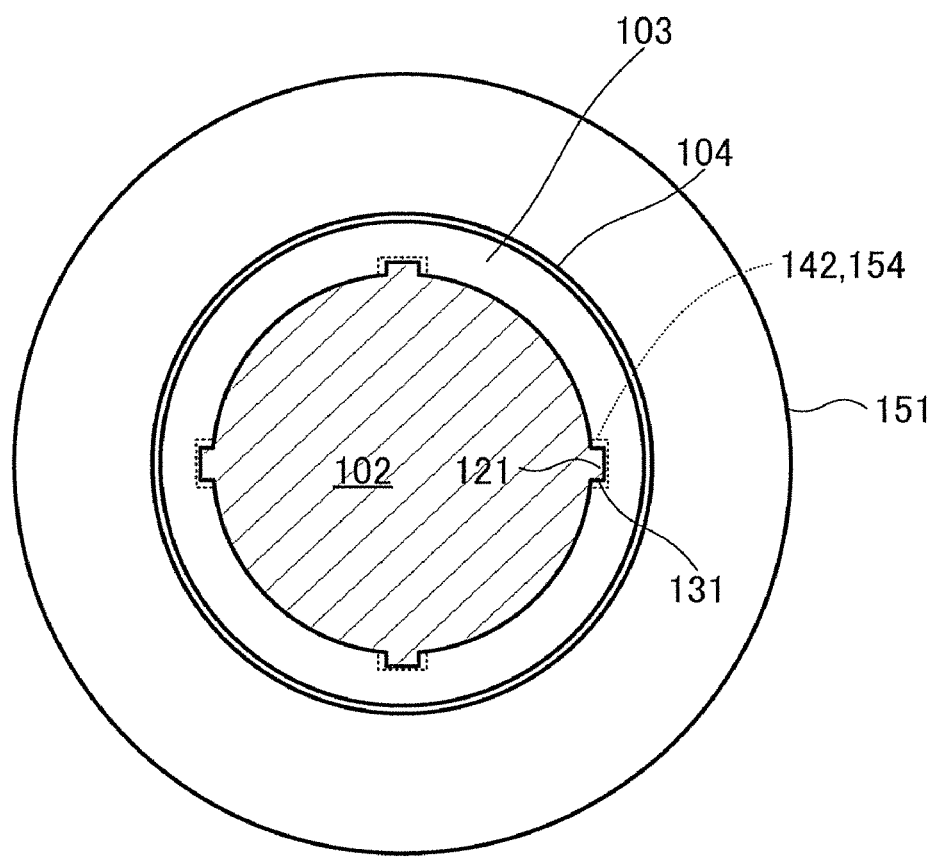
FIG. 6 is a plan view illustrating a rotational state of the flange relative to the armature.

Since guide 111 positioned at L is not required to be turned clockwise, the rotation controller has the armature fastened in a driving mode. In this mode, with reference to FIG. 6, first grooves 131 of flange 103 are centrally located both in second grooves 142 of elastic component 104 and third grooves 154 of armature 151.

Figure 7:
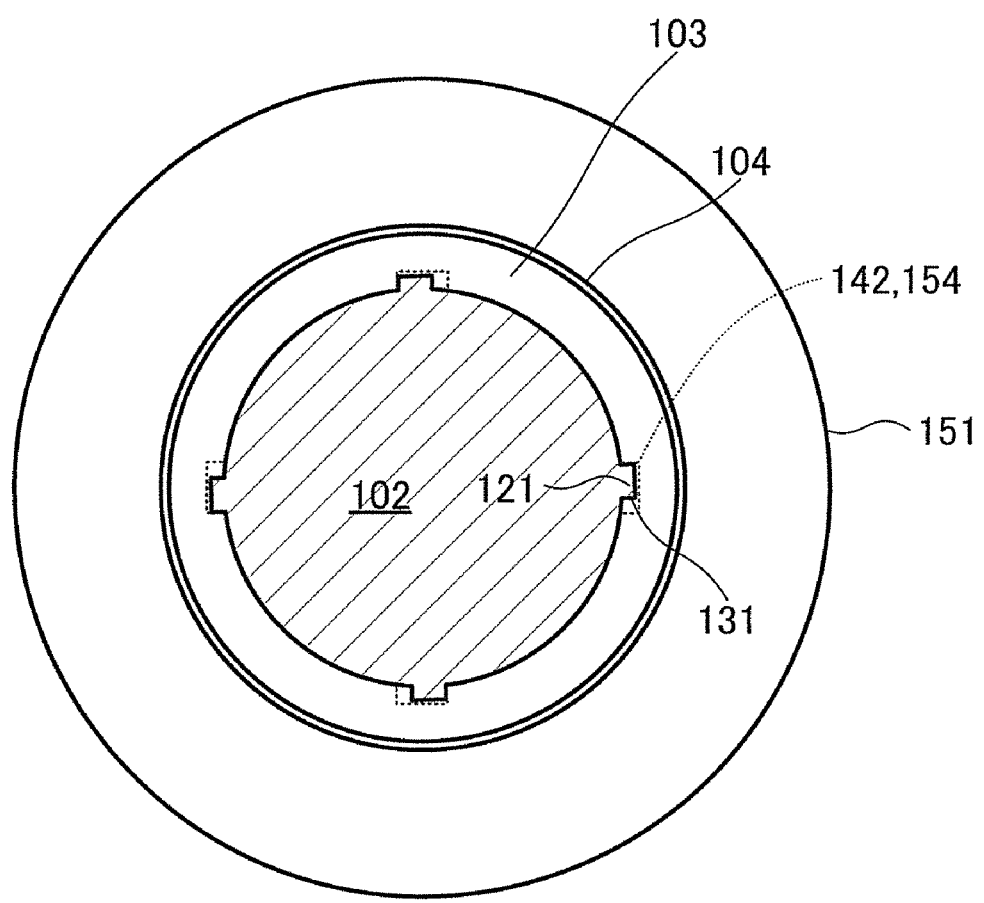
FIG. 7 is a plan view illustrating another rotational state of the flange relative to the armature.

The driver turns knob 101 counterclockwise to return guide 111 from L to D position. In this case, since armature 151 of the rotation controller is fastened, flange 103, as shown in FIG. 7, is turned slightly counterclockwise in tandem with turning of knob 101 because of flexure of elastic component 104 and allowance between first protrusions 121 and third grooves 154. The detector detects the slight counterclockwise turning of knob 101 via rotary shaft 102. Rotation controller 105 receives a signal that is sent in response to the detected result and then unfastens armature 151. This configuration allows the driver to return guide 111 to D position without particular consciousness.

Meanwhile, the driver mistakenly turns knob 101 and guide 111 positioned at L further clockwise. In this case, as with the case described above, since armature 151 of the rotation controller is fastened, knob 101 is turned slightly clockwise because of flexure of elastic component 104 and allowance between first protrusions 121 and third grooves 154. The detector detects the slight clockwise turning of knob 101 via rotary shaft 102. The vehicle receives a signal that is sent in response to the detected result and informs the driver of the incorrect action by an alarm or other means. In the meantime, armature 151 of the rotation controller remains fastened. This configuration allows the driver to notice the incorrect action.

When the vehicle is not in the driving mode, or in other similar situations, the rotation controller or the detent unit may be disabled to allow knob 101 to be freely turned. This configuration permits input device 100 to serve functions such as adjusting the flow rate of air from an air conditioner or other equipment, or adjusting sound volume on an audio system while knob 101 is allowed to freely turn, for example.

In the exemplary embodiment described above according to the present disclosure, knob 101 can be turned only within a predetermined angular range owing to the flexure of elastic component 104 and the allowance between first protrusions 121 and third grooves 154 while turning of armature 151 is inhibited by rotation controller 105. Input device 100 has detector 106 to detect slight turning through rotary shaft 102, and thus can readily release rotation controller 105 and perform other control. This configuration allows input device 100 to provide excellent operability.

While armature 151 is fastened, turning of flange 103 is limited to the width of each of third grooves 154. As a result, elastic component 104 is never immoderately flexed. This configuration can lessen the load that is put on elastic component 104, as well as junctions of flange 103, elastic component 104, and armature 151, and thereby allows input device 100 to provide great durability and long life.

The scope of the present disclosure should not be limited to the exemplary embodiment described above. For example, another exemplary embodiment according to the present disclosure may be implemented by freely combining components described herein or excluding some of the components. The scope of the present disclosure should include modifications and variations since those skilled in the art can add various design changes to the exemplary embodiment described above without deviating from the spirit and scope of the present disclosure as defined by the appended claims.

In the exemplary embodiment described above, input device 100 includes detent unit 107 and switch 108, for example. The input device may not particularly include these components.

Input device 100 can be used for operating equipment and any electrical apparatuses, such as television sets and air conditioners, other than the vehicle exemplified herein.

INDUSTRIAL APPLICABILITY

The present disclosure can be applied to vehicles, electrical apparatuses, and other equipment that are controlled by turning action.

REFERENCE MARKS IN THE DRAWINGS 100 input device
101 knob
102 rotary shaft
103 flange
104 elastic component
105 rotation controller
106 detector
107 detent unit
108 switch
109 stationary shaft
111 guide
121 first protrusion
131 first groove
142 second groove
151 armature
152 electromagnet
153 yoke
154 third groove
160 main cogwheel
161 first cogwheel
162 second cogwheel
163 sensor
200 housing

The invention claimed is:
1. An input device comprising:
a knob configured to be turned;
a rotary shaft connected to the knob, the rotary shaft being configured to turn together with the knob;
a flange disposed around an outer peripheral surface of the rotary shaft, the flange being configured to turn together with the rotary shaft;
an elastic member being disposed around the outer peripheral surface of the rotary shaft and being fixed on the flange, the elastic member having flexibility;
a rotation controller that permits or inhibits turning of the elastic member around the rotary shaft; and
a detector that detects a rotational state of the rotary shaft, wherein
the rotation controller comprises:
an armature being disposed around the outer peripheral surface of the rotary shaft and being fixed on the elastic member;

an electromagnet disposed around the outer peripheral surface of the rotary shaft and a yoke disposed around the outer peripheral surface of the rotary shaft, the yoke being configured to permit or inhibit turning of the armature around the rotary shaft in accordance with magnetic attraction of the electromagnet, and the elastic member is disposed between the flange and the armature such that the flange and the armature are locked in place.

2. The input device according to claim 1, wherein the flange and the elastic member are each annular.

3. The input device according to claim 1, wherein the flange has a first groove extending along an axis of the rotary shaft, and the other of the rotary shaft is provided with a first protrusion fitting into the first groove and being slidable along the first groove.

4. The input device according to claim 3, wherein the elastic member has a second groove that is disposed so as to fit onto the first protrusion provided on the rotary shaft and the second groove is wider than the first groove.

5. The input device according to claim 4, wherein the armature has a third groove that is disposed so as to fit onto the first protrusion provided on the rotary shaft, and the third groove is equivalent in width to the second groove and is wider than the first groove.

6. The input device according to claim 5, wherein the first groove, the second groove and the third groove are aligned along the axis of the rotary shaft.

7. The input device according to claim 1, wherein the elastic member is plate-shaped and is one of a flexible elastomer or a hard rubber.

* * * * *